United States Patent [19]

Washington

[11] 4,026,005
[45] May 31, 1977

[54] METHOD OF ASSEMBLING AND TRANSFERRING A SEAL

[75] Inventor: Richard C. Washington, Chicago Heights, Ill.

[73] Assignee: Borg-Warner Corporation, Chicago, Ill.

[22] Filed: Jan. 21, 1976

[21] Appl. No.: 650,996

Related U.S. Application Data

[62] Division of Ser. No. 505,425, Sept. 12, 1974, Pat. No. 3,947,944.

[52] U.S. Cl. .................................. 29/464; 29/469
[51] Int. Cl.² .......................................... B23Q 3/00
[58] Field of Search ............ 29/464, 466, 468, 469, 29/453, 450, 235, 234, 401; 277/1, 9.5

[56] References Cited

UNITED STATES PATENTS

| 1,069,539 | 8/1913 | Evans | 29/235 |
| 2,177,231 | 10/1939 | Tinnerman | 29/450 UX |
| 3,036,371 | 5/1962 | Gray et al. | 29/235 |
| 3,218,692 | 11/1965 | Kayser | 29/453 X |
| 3,432,172 | 3/1969 | Hendrickson | 277/1 |
| 3,487,529 | 1/1970 | Serio | 29/235 |
| 3,538,587 | 11/1970 | Shurtleff et al. | 29/235 |
| 3,563,555 | 2/1971 | Koons | 277/1 |

*Primary Examiner*—James R. Duzan
*Attorney, Agent, or Firm*—James A. Geppert

[57] ABSTRACT

A unitized transfer fixture for the assembly of sealing components to be applied to a shaft and for the transfer of the preassembled sealing components onto the shaft to a final position in the unit to be sealed. The transfer fixture is formed of a suitable plastic which may either be discarded or reused and consists of a two-piece telescoping assembling including a pilot and a sleeve with external diameters corresponding to the internal diameters of the seal assembly. The seal components are assembled on the telescoped pilot and sleeve, the pilot is positioned on the end of the shaft, and a tool aids the sleeve in pushing the preassembled seal off of the pilot onto the shaft to its final sealing position; after which the fixture is withdrawn.

4 Claims, 6 Drawing Figures

METHOD OF ASSEMBLING AND TRANSFERRING A SEAL

This is a division of application Ser. No. 505,425, filed Sept. 12, 1974, now U.S. Pat. No. 3,947,944.

BACKGROUND AND SUMMARY OF THE INVENTION

The present invention relates to a transfer fixture and more particularly to a shaft seal unitized transfer fixture for the assembly of seal components and their transfer onto a shaft and into a unit to be sealed.

Mechanical face seal components, such as utilized in refrigeration compressors, generally consist of two units; a stator and a rotor which are ordinarily installed as separate components. A precise fit is required between the units and also between the seal assembly and the unit into which it is installed. In the case of a refrigeration compressor, a precision fit is required between the seal assembly and the plenum in which it is operated. The entrance of any foreign material, even of microscopic size, or a smudge from finger marks will inhibit optimum performance and establish a leak path. Leak paths occur primarily along the shaft, in the seal area between the elastomer and the rotating member which is in contact with the stator, or at the contact noses of the superfinished areas of the stator and rotor. The present invention aids in the assembly of the seal components and in the protection of the assembled seal until its installation into the mechanism to be sealed.

Among the objects of the present invention is the provision of a unitized transfer fixture for shaft seal components. The transfer fixture may be formed of a suitable plastic material so that the fixture may be expendable or reusable for the assembly and transfer of seal components. The transfer fixture consists of a two-piece telescoping assembly; namely, a pilot and a sleeve. The diameter of both the pilot and sleeve correspond to the diameters of the unit for which the seal assembly is manufactured, with the pilot provided with a blind hole to receive the end of a shaft onto which the seal assembly is transferred. The sleeve telescopes over the pilot and acts to move the seal assembly onto the shaft.

Another object of the present invention is the provision of a transfer fixture for shaft seals wherein the seal components are assembled on the fixture and easily and smoothly transferred from the fixture into the desired installation. Seal components are installed on the fixture at their approximate working relationship and are maintained at this working relationship during all subsequent handling, including the transfer operation onto a shaft and their assembly into a unit to be sealed.

A further object of the present invention is the provision of a transfer fixture for a shaft seal where the fixture aids in providing a precise fit and protecting the primary leak paths. The entrance of any foreign material, such as microscopic specks or finger smudges, is prevented as the leak paths are protected from immediately after manufacture and assembly and until installation into the mechanism to be sealed due to the preassembly of the seal components onto the transfer fixture. Additionally, the concentricity relationship of the seal assembly is maintained at all times during installation.

Further objects are to provide a construction of maximum simplicity, efficiency, economy and ease of assembly and operation, and such further objects, advantages and capabilities as will later more fully appear and are inherently possessed thereby.

DESCRIPTION OF THE PREFERRED EMBODIMENT

Figure 1:
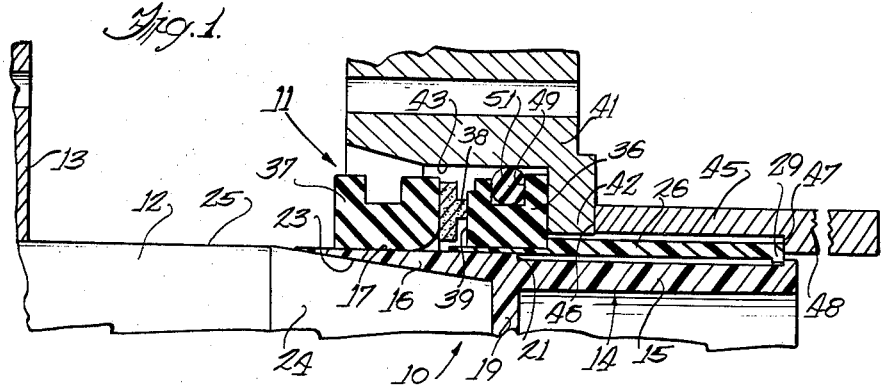
FIG. 1 is a vertical cross sectional view of the shaft seal unitized transfer fixture with a preassembled seal shown in preparation for transfer to its final sealing position.
Figure 2:
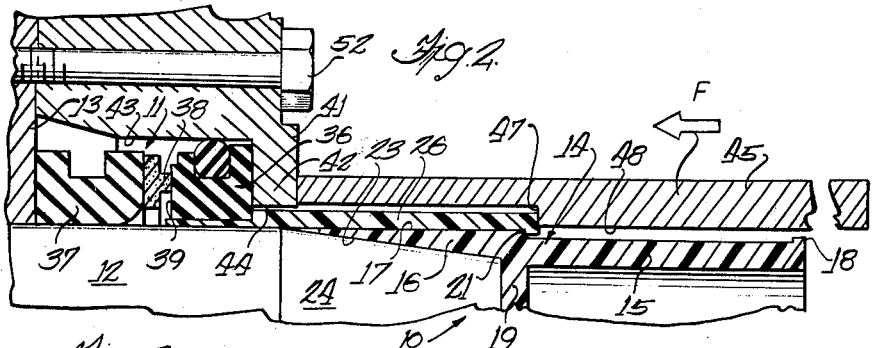
FIG. 2 is a view similar to FIG. 1, but with the seal assembly shown in its operative position.

Referring more particularly to the disclosure in the drawing wherein is shown an illustrative embodiment of the present invention, FIGS. 1 and 2 disclose an assembled transfer fixture 10 utilized for the assembly and maintenance of a seal 11 until it is transferred onto a shaft 12 and positioned in its final sealing position abutting against a stop 13. The transfer fixture consists of a pilot 14 and a sleeve 26 fitting together in telescoping relationship.

Figure 3:
FIG. 3 is a side elevational view, partially in cross section, of the pilot of the transfer fixture.
Figure 4:
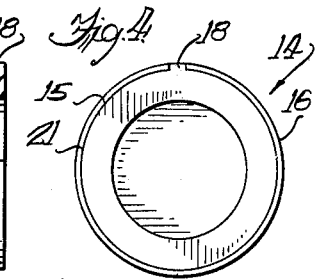
FIG. 4 is an end elevational view of the pilot taken from the right-hand end of FIG. 3.

As more clearly seen in FIGS. 3 and 4, the pilot 14 is formed of a cylindrical member or barrel 15 having a portion 16 of a slightly greater diameter at one end to provide an exterior cylindrical surface 17, and a radial tab 18 is formed integral with the member at the opposite end. A partition or wall 19 extends across the member generally aligned with the shoulder 21 defining the enlarged diameter portion 16. A blind hole 22 is formed by an inwardly tapering interior wall surface 23 in the portion 16 and intersecting the wall 19. The blind hole 22 has the wall 19 positioned at such a depth and the surface 23 is tapered to comformably receive the tapered end 24 of the shaft 12 with the diameter of the exterior shaft surface 25 corresponding with the diameter of the surface 17.

Figure 5:
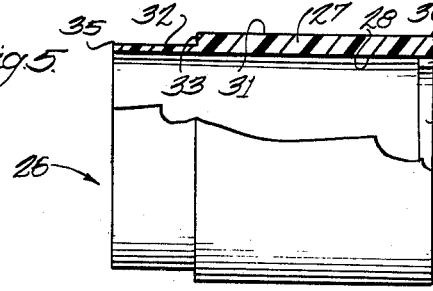
FIG. 5 is a side elevational view, partially in vertical cross section, of the sleeve.
Figure 6:
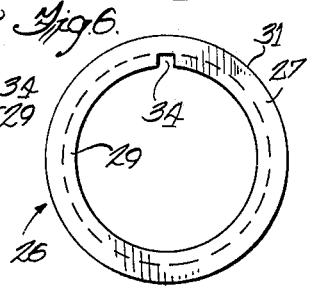
FIG. 6 is an end elevational view of the sleeve taken from the right-hand end of FIG. 5.

The sleeve 26 is shown in FIGS. 5 and 6 and comprises a cylindrical member 27 having a uniform interior surface 28 except for a radially inwardly extending flange 29 at one end 30, and a uniform exterior surface 31 except for a portion 32 of a reduced diameter at the opposite end of the sleeve; the intersection of portion 32 with the member 27 defining a shoulder 33. The radial flange 29 is provided with a notch 34 of a size to receive and allow passage of the tab 18 therethrough. The reduced diameter end 35 of the sleeve may be rounded slightly at the outer edge to prevent damage to the sealing elements during assembly.

The diameter of the interior surface 28 of the sleeve 26 is only slightly larger than the diameter of the exterior surface 17 on the portion 16 of the pilot 15 so as to slide thereover. Also, the internal diameter of the radial flange 29 is slightly greater than the diameter of the cylindrical member 15, but is not as large as the diameter of the surface 17. Thus, upon relative movement between the pilot and the sleeve, the flange 29 would be movable forwardly on the pilot until it abutted the shoulder 21. The pilot 14 and sleeve 26 are preassembled by sliding the reduced diameter end portion 32 over the cylindrical member 15 and onto the portion 16. The stop pin or tab 18 is aligned with the notch 34 so the flange 29 is moved onto the member 15 and, when the notch 34 clears the stop pin 18, the sleeve 26 is rotated or twisted relative to the pilot 14 so that the notch and stop pin are out of alignment. Thus, the pilot and sleeve are preassembled into a unitized transfer fixture.

In FIGS. 1 and 2, the fixture 10 is shown for the assembly and transfer of one illustrative type of seal assembly 11. A seal stator 36 is initially installed over the surface 17 and onto the reduced portion 32 of the sleeve to abut the shoulder 33. The seal rotor 37 is then installed onto the surface 17 until the rotor nose 38 is in intimate contact with the radial surface 39 of the stator 36. Contact is maintained due to an interference fit between the inner diameter of the rotor 37 and the exterior surface 17 of the enlarged portion 16. Seal assembly primary leak paths are now in a protective environment for subsequent handling.

The blind hole 22 of the pilot 14 is positioned over the tapered end 24 of a shaft 12, such as a rotary shaft for a refrigeration compressor. A cap 41 having an inwardly extending radial flange 42 defining a recess 43 to receive the assembled seal 11 is positioned onto the sleeve 26 from the right-hand end, as seen in FIG. 1, followed by a generally cylindrical hollow tool 45 having an end surface 46 abutting the cap 41 and an internal shoulder 47 adapted to engage the flange end 30 of the sleeve 26. The cap flange 42 has an interior surface 44 of a diameter slightly larger than the diameter of the exterior surface 31 of the sleeve, and the interior surface 48 beyond the shoulder 47 is of a diameter slightly greater than the diameter defined by the stop pin or tab 18.

The seal assembly 11, the cap 41 and the sleeve 26 are pushed with the tool 45 and, as pressure is applied as indicated by the arrow F, the rotor 37 slides off of the surface 17 of the pilot 14; the diameter of the surface 17 being the same as the diameter of the shaft 12. It should be noted that the depth of the blind hole 22 in the pilot is adjusted so that the tail of the rotor 37 engages the full diameter of the shaft 12 before it is completely pushed off of the corresponding diameter of the pilot. As the rotor will now frictionally engage the shaft 12, the concentricity of the seal assembly 11 and the necessary friction to maintain the preassembled relationship is held in this manner during the transfer operation. Simultaneously, the sleeve 26 and the stator 36 are moved along the barrel 15 of the pilot 14 following the rotor 37.

The stator 36, as shown in FIG. 1, has an annular groove 49 receiving a resilient O-ring 51 that frictionally engages the wall of the recess 43 of cap 41 to retain the concentricity therebetween, and the cap is moved by the tool 45 simultaneously with the sleeve 26 and seal assembly 11. Pressure is applied until the rotor 37 bottoms against the stop 13 which, in the case of a refrigeration compressor, is the base of the seal plenum. As the interior surface 28 of the sleeve 26 passes the end of portion 16, it is also transferred to the full diameter of the shaft 12 before leaving the pilot 14, thus maintaining the preassembled nose concentricity and assuring that the clearance of internal diameter of the stator 36 will be concentric with the shaft 12. Once the seal assembly is bottomed onto the stop 13, as seen in FIG. 2, the cap 41 is suitably secured to the stop, such as by the bolts 52, the tool 45 is removed, and then the pilot 14 and the sleeve 26 are extracted by a simple manual pull; the seal assembly 11 being left in operative position in the plenum. Also, as shown in FIG. 2, the flange 29 on the sleeve 26 limits forward movement of the sleeve relative to the pilot 14 by abutting the shoulder 21.

Although the present invention has been described for the assembly and transfer of a seal assembly utilized in the plenum of a refrigeration compressor, the transfer fixture would be useful for installation of many different types of face seals, and it is not intended that the present invention be so limited in scope.

I claim:

1. A method of assembling and transferring a seal assembly to a final operative position on a rotary shaft, comprising the steps of providing a transfer fixture consisting of a pilot and a sleeve in telescoping relationship for limited relative movement therebetween, positioning a seal stator onto the sleeve, positioning a seal rotor onto the pilot in abutting relation with the stator, positioning the transfer fixture onto the rotary shaft, the pilot having an external diameter equal to the diameter of the shaft and the sleeve having an internal diameter slightly greater than the external diameter of the pilot to slide thereover, said seal rotor frictionally engaging the pilot or the shaft, positioning a cap having a recess over the sleeve prior to the transfer operation and a hollow tool is telescoped over the sleeve and pilot to abut the cap at its forward end, and force is applied to said tool to urge the seal assembly, cap and sleeve forward relative to the pilot and push the assembled seal off of the pilot onto the shaft, said sleeve maintaining the concentricity of the seal stator relative to the shaft and seal rotor from assembly until the seal is secured in operative position.

2. A method of assembly as set forth in claim 1, wherein the tool is provided with an internal shoulder adapted to abut the rear end of the sleeve when the tool abuts the cap.

3. A method of assembly as set forth in claim 2, wherein said tool moves said sleeve relative to said pilot until the seal assembly is operatively positioned on the shaft, securing said cap to the shaft supporting structure, and maintaining said sleeve in the seal assembly until the cap is secured, and then manually withdrawing the pilot and sleeve.

4. A method of assembly as set forth in claim 1, wherein the seal stator remains on the sleeve during the transfer operation and until positioned in operative sealing position.

* * * * *